United States Patent [19]

Connell

[11] Patent Number: 5,275,090

[45] Date of Patent: Jan. 4, 1994

[54] FOOD FRYING AND DISPENSING DEVICE

[75] Inventor: David P. Connell, Johnston, R.I.

[73] Assignee: Motion Technology, Lincoln, R.I.

[21] Appl. No.: 847,460

[22] Filed: Mar. 6, 1992

[51] Int. Cl.$^5$ .................. A47J 37/00; A47J 37/12
[52] U.S. Cl. ................................ 99/336; 99/357; 99/407; 99/410
[58] Field of Search ............... 99/336, 337, 330, 333, 99/344, 404, 407, 409-, 413, 357; 55/316, 387, DIG. 36; 426/438, 509, 516; 221A/150HC

[56] References Cited

U.S. PATENT DOCUMENTS

| | | | |
|---|---|---|---|
| 3,818,820 | 6/1974 | Harris et al. | 99/411 |
| 4,457,947 | 7/1984 | Schmidt | 426/438 |
| 4,502,372 | 3/1985 | Mariotti | 99/330 |
| 4,505,194 | 3/1985 | Bishop et al. | 99/407 |
| 4,539,898 | 9/1985 | Bishop et al. | 99/336 |
| 4,586,429 | 5/1986 | Hawkins | 99/407 |
| 4,646,627 | 3/1987 | Bartfield et al. | 99/357 |
| 4,677,278 | 6/1987 | Knoll | 221/150 A |
| 4,722,267 | 2/1988 | Galockin et al. | 99/357 |
| 4,748,902 | 6/1988 | Maurantonio | 99/404 |
| 4,898,091 | 2/1990 | Rozak et al. | 99/336 |

*Primary Examiner*—Timothy F. Simone
*Attorney, Agent, or Firm*—Lorusso & Loud

[57] ABSTRACT

A food cooking device comprising a housing, a food intake means mounted on a front wall of the housing, a reservoir in the housing for retaining a cooking liquid, support means disposed in the housing for supporting food, drive means in the housing for moving the support means, a food outlet means disposed in a wall of the housing, and power means for heating the cooking liquid, the drive means being adapted to position the support means to receive food from the food intake means, immerse the food in the cooking liquid, to remove the food from the cooking liquid, to hold the food for drainage, and to deliver the food to the food outlet means for removal from said device.

21 Claims, 6 Drawing Sheets

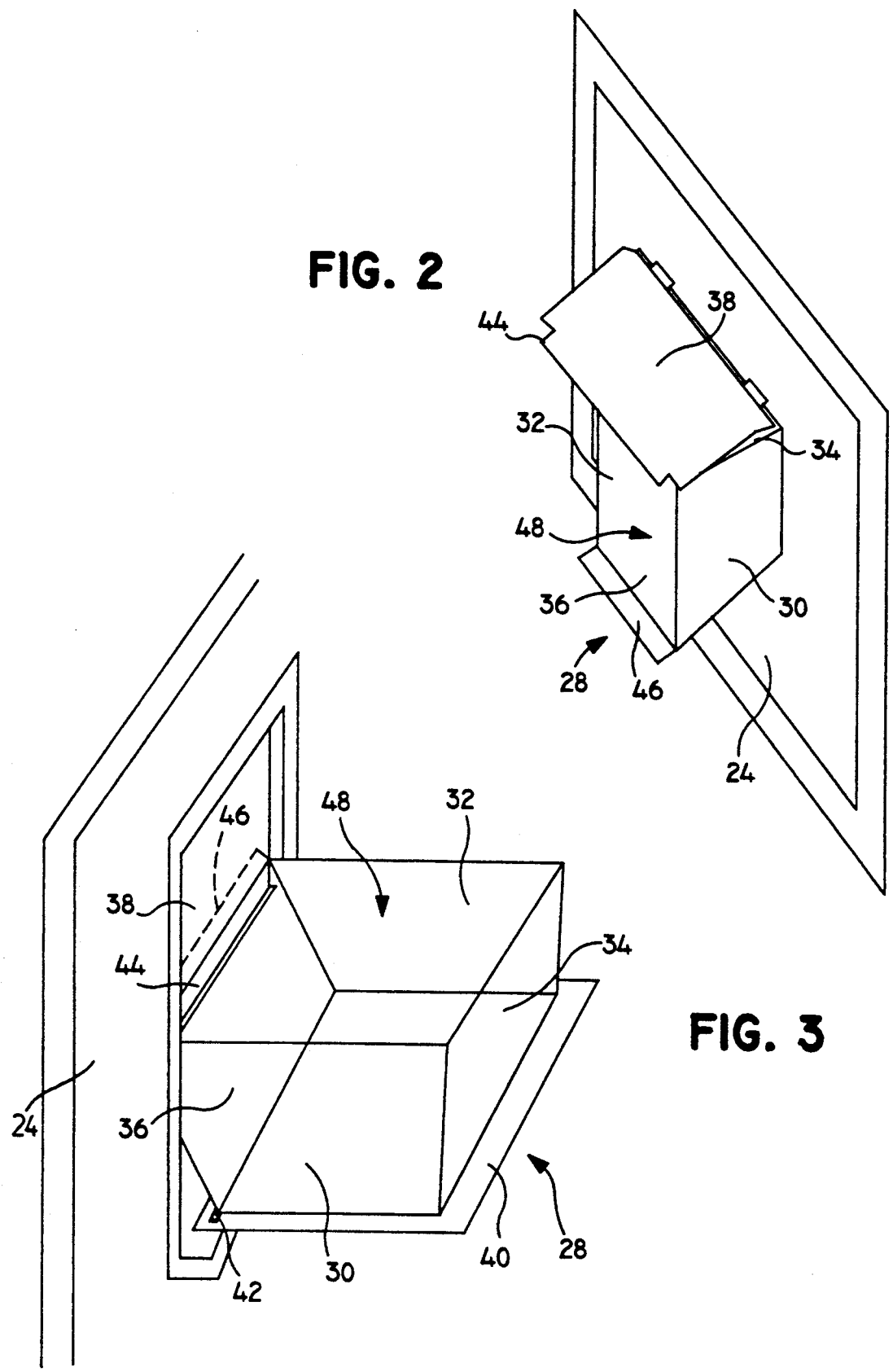

FOOD FRYING AND DISPENSING DEVICE

BACKGROUND OF THE INVENTION

1. FIELD OF THE INVENTION

This invention relates generally to an automatic cooking device, and has particular reference to an improved food frying device having automatic cooking and dispensing means.

2. DESCRIPTION OF THE PRIOR ART

Fryers are widely used in the restaurant and commercial retail business for cooking a variety of food products such as french-fried potatoes, vegetables, chicken, meat and fish.

In the commercial setting it is particularly important that the frying device be easily and safely operated by an operator. It should not be necessary for the operator to come into contact with the interior of the device, as when food is being introduced into or removed from the device. In addition to preventing the risk of contact with the hot cooking oil, the lack of contact with the interior of the device also prevents risk of food contamination. It also should be possible to prepare more than an individual sized portion in one frying session. In addition, the device must be capable of being easily and readily disassembled for cleaning. Cleaning the device is important for both hygienic purposes and for increasing the reliability of the device through preventing the build up of fat and food particles.

It is generally known in automatic frying devices to place food in a basket, automatically immerse the basket in a vat of oil until the cooking is complete, and then automatically remove the basket from the oil and deposit the food into a holding container, with the removal of odors and particles being accomplished by use of a filtration system.

U.S. Pat. No. 4,457,947, issued Jul. 3, 1984 to Schmidt et al. discloses a consumer operated food frying machine which receives frozen food from an operator in a specifically designed container. The machine then automatically transfers the food within the container to a frying station by means of a rotating receptacle and dumping arms. The receptacle proceeds to automatically return the food to its original container within the interior of the machine. The access door is latched by a solenoid to prevent access during a cooking cycle.

U.S. Pat. No. 4,505,194, issued on Mar. 19, 1985 to Bishop et al. discloses a food frying device with a pivotal lid which covers an aperture and a funnel in which the food is initially deposited. When the operator closes the lid, a solenoid is released and locks the pivotal lid in the closed position. A basket of food is then lowered into cooking oil and raised when cooking is complete. The basket then rotates and dumps the food into another funnel which guides the cooked food into yet another funnel which deposits the food into a container located within the interior of the device.

U.S. Pat. No. 4,520,717, issued Jun. 4, 1985 to Bohrer, Jr. et al., discloses a food frying device with a pivotal tray or door which is hingedly attached to the front portion of a cabinet. The tray pivots downward to a generally horizontal position to enable a basket of food to be both inserted and removed from the cooking oil. The basket disclosed in Bohrer, Jr. et al. includes insulation material formed around each handle of the basket in order to prevent the operator's hands from being burned while inserting and removing the basket from the device. The device also includes an exhaust system which pulls air in through a lower portion of the cabinet and exhausts air out through the top of the cabinet, having a one-piece filter unit positioned in the path of air flow upstream. The removable filter includes a paper filter together with activated charcoal particles configured as an integral unit.

U.S. Pat. No. 4,586,429, issued on May 6, 1986 to Hawkins, discloses an automatic food cooking and dispensing device having a food hopper for storing food, the food hopper having a cylinder device with a recess which enables a particularly shaped food chip to fall into the food container after the food container is placed into the oil. Where food other than chips is to be dispensed, the cylinder device may have a differently shaped recess. Hawkins also discloses a pivotable base wall at the bottom of a food container which falls downwardly and consequently causes food to fall vertically downward into a receiving holder. When the container is disposed over the discharge chute, the base wall which is held closed by spring clips and an adjustable screw, is opened to allow for the depositing of food. The food container is mounted on parallel linkages for movement between an inoperative position, a position in which the container is disposed within the cooker, a position in which the container is disposed over the cooker, and a position in which the container is disposed over the discharge chute, the discharge chute leading to a food holder. The food holder is dispensed from a dispensing unit which holds a cartridge of food holders at the same time as the food container is placed in the oil. A slidable window is provided in the cabinet adjacent the food holder so that the holder can be removed by the operator.

U.S. Pat. No. 4,941,400, issued on Jul. 17, 1990 to Moore, discloses a ventless hood for a deep fat fryer. The deep fat fryer disclosed in Moore is a pressure cooker operating by the use of a heated cooking oil bath and steam under pressure. The forwardly extending portion of the hood supports a pair of angularly related baffle filters. The angularly related baffle filters are supported by an intermediate brace. Above the baffle filters is a metallic mesh filter which is surmounted by a charcoal filter. Directly above the charcoal filter is a stainless steel panel which supports a radiator. Directly above the radiator is an opening in the top panel of the hood. A fan in the vertical portion of the hood is arranged to draw ambient air and cooking gasses through the filter assembly, the outlet of the fan discharging through the top of the hood assembly.

The present invention is intended to provide a solution to several operating and maintenance problems which arise with the use of the known automatic frying devices. In the known devices, the operator must either handle the insulation-covered cooking basket with just-cooked food within, or the operator must place his or her hand into the interior of the frying housing and retrieve a holder which recently received cooked food. In either instance, the operator risks being burned by either reaching in the tray or door and either grasping for the basket or placing food in the basket, or reaching in the window and grasping a food holder.

Another serious and prevalent problem arises with the quality of air which is emitted from the prior art. The filtration system which is used in coordination with the cooking means must prevent a significant amount of oil particles, oil-laden vapors, and odors from reaching the atmosphere. Additionally, larger sized automated units utilize an external exhaust.

An additional problem experienced in the use of prior art devices is the risk of spoilage and contamination of food when food is stored in the device.

A still further shortcoming in devices of the prior art is the need for additional storage space.

There is also the problem of needing additional or different parts to enable a variety of foods to be used in the device. For instance, in a previously mentioned prior art device, the recesses which allow stored food to fall into the food basket must be shaped according to the particular food product.

Additional problems arise with the numerous movable parts which some prior art references utilize to enable the cooked food to be dispensed. The complex automated mechanisms utilized in such devices pose additional reliability and maintenance problems. In addition, the necessity of refilling cartridges or other supply means can lead to both high costs and problems of reliability.

SUMMARY OF THE INVENTION

It is therefore an object of the present invention to provide an improved frying device with numerous safety features which prevent the user from contacting any portion of the interior of the frying housing.

It is another object of the present invention to provide a frying device with an exhaust system with an integral ventless hood which prohibits oil particles, oil-laden vapors, and odors from departing from the device.

It is yet another object of the present invention to provide a frying device for use with all food products without the requirement that the product be stored in specially designed packaging.

It is still another object of the present invention to provide a frying device for use with greater than individually sized portions of food.

It is still a further object of the present invention to provide a frying device which is simply constructed, readily operated, and easily maintained.

With the above and other objects in view, as will hereinafter be described, a feature of the present invention is the provision of a food cooking device comprising a housing, a food intake means mounted on a front wall of the housing, a reservoir in the housing for retaining a cooking liquid, support means disposed in the housing for supporting food, drive means in the housing for moving the support means, a food outlet means disposed in a wall of the housing, and power means for heating the cooking liquid, the drive means being adapted to position the support means to receive food from the food intake means, immerse the food in the cooking liquid, to remove the food from the cooking liquid, to hold the food for drainage, and to deliver the food to the food outlet means for removal from said device.

A further feature of the invention is the provision of an automatic frying and dispensing device, the device including a housing with a front wall, the front wall comprising a door portion enabling access to the interior of the housing, a food intake means, pivotally connected to the door portion, which prohibits an operator's contact with the interior of the housing, a reservoir within the housing accommodating a reservoir of liquid, and a support means comprised of a basket assembly adapted to be located within the reservoir of oil, a drive means connected with the basket assembly for automatically positioning the basket in receiving, lowering, raising, drainage and depositing positions, and an exit chute located in a bottom portion of the housing.

In accordance with a further feature of the invention, the device includes an exhaust means located in air circulating connection with the housing, the exhaust means comprising a unified sequential filtration means and an air migration means, the exhaust means being adapted to filter an upstream path of air flow by removing odors, oil particles, and oil-laden vapors before the air is exhausted back into the atmosphere.

In accordance with a still further feature of the invention, the device includes a locking means located on the front wall of the housing, which in lock position, prohibits access to the interior of the housing.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings:

FIG. 2 is a simplified perspective view of the rear of a closed door or chute of the food frying device according to the present invention;

FIG. 3 is a simplified perspective view of the front of an open door or chute of the food frying device according to the present invention;

DESCRIPTION OF THE PREFERRED EMBODIMENTS

Figure 1:
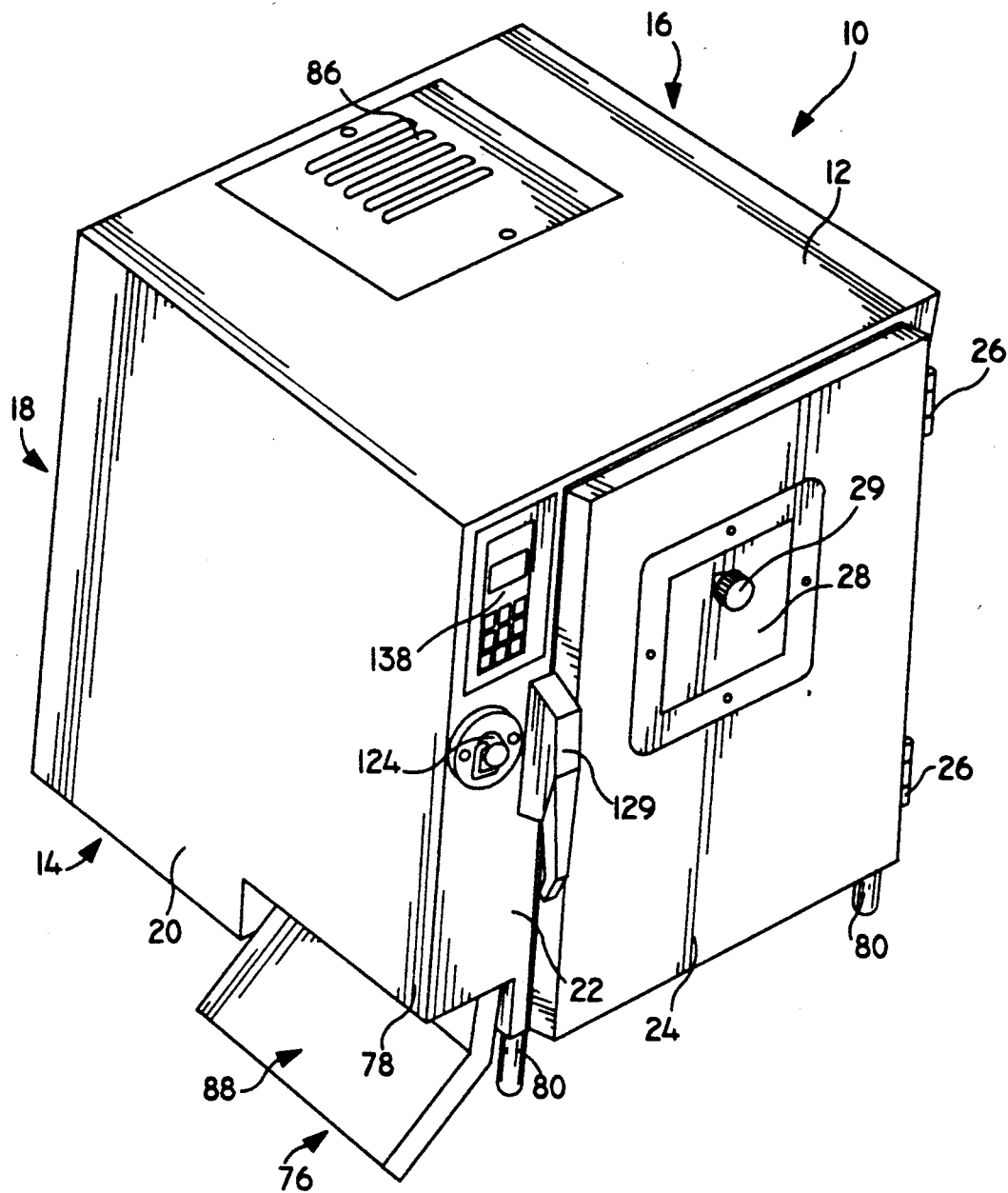
FIG. 1 is a simplified perspective view of one form of food frying device illustrative of an embodiment of the invention.

Referring to the drawings, and particularly FIG. 1, there is shown an automatic food frying and dispensing device illustrative of the present invention. The automatic food frying device comprises a housing 10, generally rectangular in shape, which accommodates the functioning components of the device. The housing 10 provides a substantially sealed chamber in which the functioning components are confined to protect against contamination of the food. The device preferably is constructed from stainless steel.

The housing 10 is comprised of a top wall 12, a bottom wall 14, two side walls 16, 20, a back wall 18 and a front wall 22. The front wall 22 includes a door portion 24 which permits access to the interior of the housing 10. The door portion 24 is attached to the front wall 22 by hinges 26, and is easily removed for cleaning.

Traversing the door portion 24 is a food intake means 28. The food intake means 28 comprises a door or chute which is pivotally connected to the door portion 24. Knob 29 provides an easy means for the operator to grasp the door or chute 28. The door or chute 28 is shown from the back surface of the door portion 24 in a closed position in FIG. 2, and in an open position in FIG. 3. The door or chute 28 is comprised of two inwardly extending side walls 30, 32, an upper wall 34, a chute plate 36, an inhibition plate 38 and an intake door 40. The intake door 40 is opened from the exterior surface of the intake door 40 and the intake door 40 turns downward to a generally horizontal position as shown in FIG. 3. The door or chute 28 is supported by a support rod 42, located in a horizontal position at the base of the intake door 40. As the intake door 40 is opened, the inhibition plate 38 moves from a generally horizontal stationary position resting on the upper wall 34 of the door or chute 28, as shown in FIG. 2, to a generally vertical position abutting the chute plate 36, as shown in FIG. 3. When the inhibition plate 38 encounters the chute plate 36, an end piece 44 on the inhibition plate 38 engages with an end piece 46 on the chute plate 36, acting as a barrier to the interior of the housing 10. In addition, the engaging of the end piece 44 with the end piece 46 causes the door or chute 28 to stop its rotation.

In operation, food is deposited by an operator into a cavity 48 formed by the side walls 30, 32, upper wall 34, and chute plate 36. The operator is prevented from contacting any portion of the interior of the housing by means of the abutting of the end piece 44 on the inhibition plate 38 and end piece 46 on the chute plate 36. This serves as one of the safety features of the invention, preventing heat and scaulding oil from reaching the operator. In addition, any variety of food product may be placed in the cavity 48.

When the chute or door 28 is closed by the operator, the chute plate 36 guides the food into a support means 50 (FIG. 4), located in a bottom front portion of the housing 10. The support means comprises a basket assembly. In one embodiment, the basket assembly 50 is constructed from stainless steel wire mesh.

Figure 5:
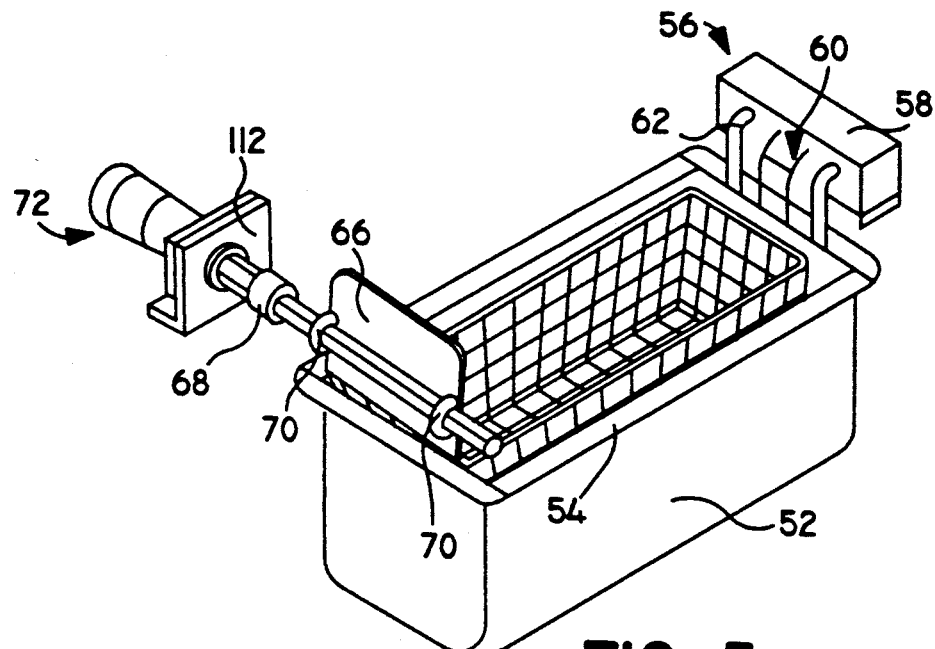
FIG. 5 is a simplified perspective view of a basket assembly disposed in a reservoir and power means of the food frying device according to the present invention.

When the basket assembly 50 receives the food, the basket assembly 50 is generally located within a reservoir 52 (FIG. 5), in which the cooking is accomplished. The reservoir 52 accommodates a reservoir of oil (not shown). In one embodiment, as shown in FIG. 5, the reservoir 52 comprises a rectangular stainless steel bowl with four side lips 54 which serve to ensure that the food is deposited within the reservoir 52. The reservoir 52 is adapted to be filled with oil or other cooking substance, which can be filled close to the top of the bowl, and drained through a turn valve (not shown) at the base of the bowl.

A power means 56 (FIG. 5) is fixed by a bracket (not shown) to the reservoir 52. The power means 56 includes a heating element 58, temperature controls 60 and RTD (Resistance Temperature Detector) terminals 62 which remain close to the bottom surface of the reservoir 52, in direct contact with the oil.

Figure 4:
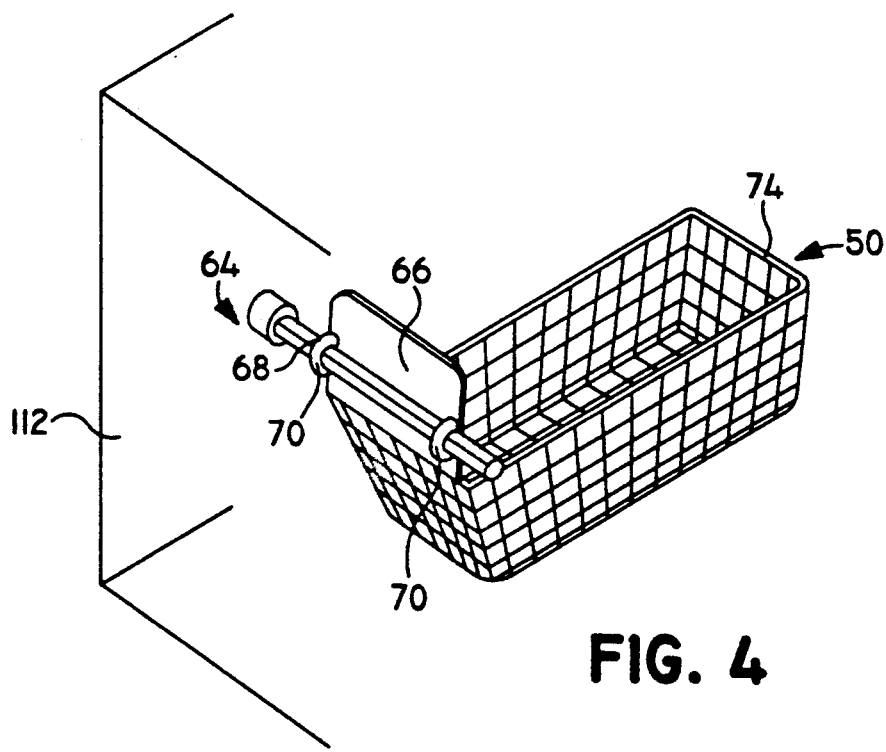
FIG. 4 is a simplified perspective view of a basket assembly of the food frying device according to the present invention.

As shown in FIG. 4, a drive means 64 is provided for within the basket assembly 50, by which the food is deposited from the basket assembly 50 to the exterior of the housing 10. The drive means 64 enables an operator to receive the fried food outside of the housing 10, without ever having to come into contact with the interior of the housing 10.

The drive means 64 comprises a motored shaft disposed within an extended side wall 66 of the basket assembly 50, as shown in FIG. 4. The motored shaft comprises a motorized rod 68 which fits through two support brackets 70 on the back surface of the extended side wall 66 of the basket assembly 50. The motorized rod 68 is supported between a barrier wall 112, and the back surface of the front wall 22 of the housing 10. As shown in FIG. 5, the motorized rod 68 protrudes through the barrier wall 112 (shown in part). On the other side of the barrier wall 112, the motorized rod 68 is connected to a motor 72 mounted on its side. Each of these components are easily removable for cleaning and maintenance.

The motored rod 68 enables movement of the basket assembly 50 between five cyclical positions, including positions for receiving the food from the chute or door 28 and for depositing the food to the exterior of the housing 10. The rotation of the basket assembly 50, provided for by the motored rod 68, rests the basket assembly 50 in the first food receiving position immediately above the oil reservoir. The basket 50 in this first position does not make contact with the oil. Once the food is deposited in the basket assembly 50, the motored rod 68 rotates the basket into the second food lowering position. In this position, the basket assembly 50 is immersed within the oil reservoir in the reservoir 52. The food is cooked in this second position. When the food cooking phase has finished, the motor rod 68 rotates the basket assembly 50 into the third food raising position. In this position, the basket assembly 50 is removed from the oil reservoir, and raised to a position directly above the reservoir 52. The motored rod 68 then rotates the basket assembly 50 by raising a side wall 74 (FIG. 4) upward toward the top wall 12 of the housing 10 and into its fourth, or oil drainage position. In one embodiment, the side wall 74 of the basket assembly 50 is raised 45° from the horizontal position The raising of the side wall 74 of the basket assembly 50 is provided for in order to drain off any excess fat or oil from the fried food product. In one embodiment, the rod 68 provides for an average of a 12 second drainage period. The motored rod 68 continues to rotate the basket assembly 50 into a fifth, or food deposit position, wherein the basket assembly is further rotated toward the top wall 12 of the housing 10. In one embodiment, in the fifth food deposit position, the basket 50 is rotated around the motored rod 68 until the opposite side wall 74 of the basket assembly 50 reaches and makes contact with the side wall 20 of the housing 10. At this point, the basket assembly has been rotated from an initial horizontal position to a generally vertical position.

As the basket assembly 50 reaches a vertical position, the food is deposited by the basket assembly 50 in a food outlet means 76 (FIG. 1) located at the base of the side wall 20 of the housing 10, directly beneath the side wall 74 of the basket assembly 50. The food is directed into the food outlet means 76 by means of the extended side wall 66 of the basket assembly 50, which serves as a guiding chute for the cooked food.

The food outlet means 76 comprises of a planar member which originates within the housing 10 as a vertically disposed planar member. As the planar member protrudes from a severed corner 78 of the housing 10, the planar member angles outwardly and extends away from the housing 10 and finally rests upon generally the same plane as legs 80 of the housing 10. The angular planar member 76 enables the food which was withdrawn from the vertically disposed basket assembly 50 to exit from the interior of the housing 10.

In other embodiments, there are alternative food outlet means located in the severed corner 78 of the housing 10, to provide for a variety of destinations for the finished food.

The motored rod 68 then rotates the basket assembly 50 back into the fourth, or oil drainage position and into the fifth, or food deposit position. The repeating of this process ensures the completion of oil drainage as well the depositing of all the food in the basket assembly 50.

The planar member 76 provides for easy access to the fried food product. In the restaurant and commercial setting, it is particularly important that the operator is shielded from potential risks involved with coming into contact with the interior of the frying device, as well as preventing potential contamination from contact with the food. In the present invention, both the end piece 44 on the inhibition plate 38 in coordination with the end piece 46 on the chute plate 36 and the food outlet means 76 provide a safe environment for the operator, in addition to preserving the freshness of the cooking oil by minimizing the oxygen available to contact the exposed oil surface.

Figure 6:
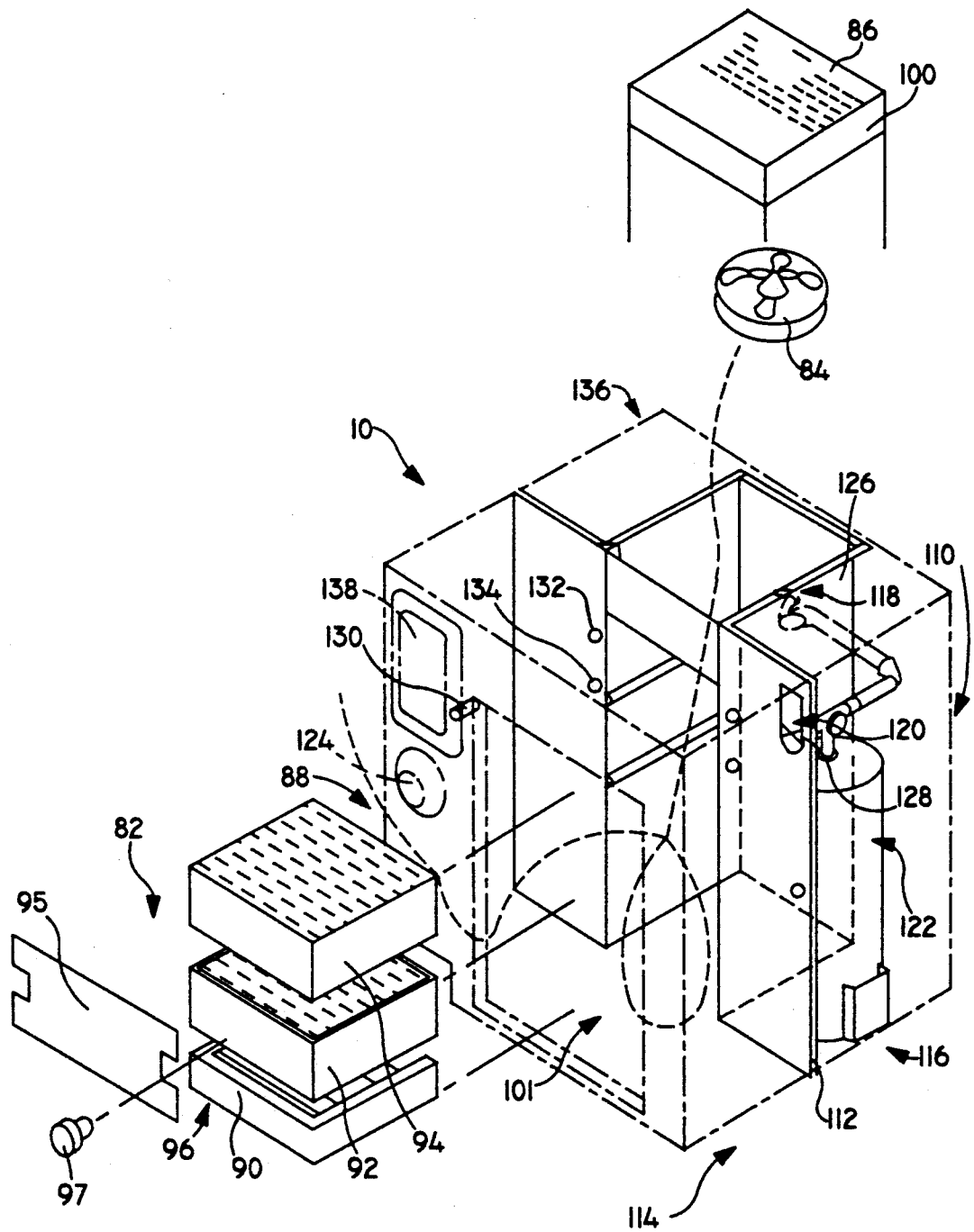
FIG. 6 is a simplified exploded view of the food frying device according to the present invention.

With reference to FIG. 6, exhaust means is shown which is in communication with air circulating in the housing 10 (not shown in FIG. 6). As will be further discussed, various parts of the exhaust means are in communication with the path of air which is caused to migrate through the housing 10. The exhaust means comprises a unified sequential filtration means 82 and an air migration means 84, 86, 88 which establish the circulation of air into the housing 10, the filtration of oil particles, and other such substances from the air vapors, and the exiting of oil-free air from an integral ductless hood in the housing 10.

In a preferred embodiment, as shown in FIG. 6, the unified sequential filtration means 82 is located within a predetermined path of the air circulation produced by the air migration means 84, 86, 88. The term predetermined path refers to the placement of the unified sequential filtration means between the air inlet orifice 88 and the air outlet orifice 86 of the air migration means to enable the filtration of oil particles which result during the frying process.

The unified sequential filtration means 82 further includes a spatter arrest means 90, an aerosolized particulate means 92, and an adsorption filter means 94, with the spatter arrest means 90 being disposed downstream of the aerosolized particulate means 92, which is disposed downstream of the adsorption filter means 94. A cover plate 95 prevents the operator from contacting any portion of the unified sequential filtration means 82, as well as ensuring only one air migration path through the unified sequential filtration means. The cover plate 95 is secured to the unified sequential filtration means by machine screws 97.

The spatter arrest means 90 preferably may comprise a grease baffle filter. The grease baffle filter is constructed from stainless steel and is provided with a plurality of perforations by which collected grease can run into a trough 96 formed by at the base of the grease baffle filter 90. The grease baffle filter 90 is supported so as to extend downwardly toward the back wall 18 of the housing 10. As known in the art, baffle filters also act as fire blocks, tending to prevent flame from reaching the other elements located above the grease baffle filter. The grease baffle filter traps grease which is spattered from the reservoir during the cooking process.

The aerosolized particulate means 92 preferably comprises an expandable metallic mesh filter. The mesh filter is constructed from stainless steel. The mesh filter traps grease and particulate matter which circulate past the grease baffle filter.

Figure 7:
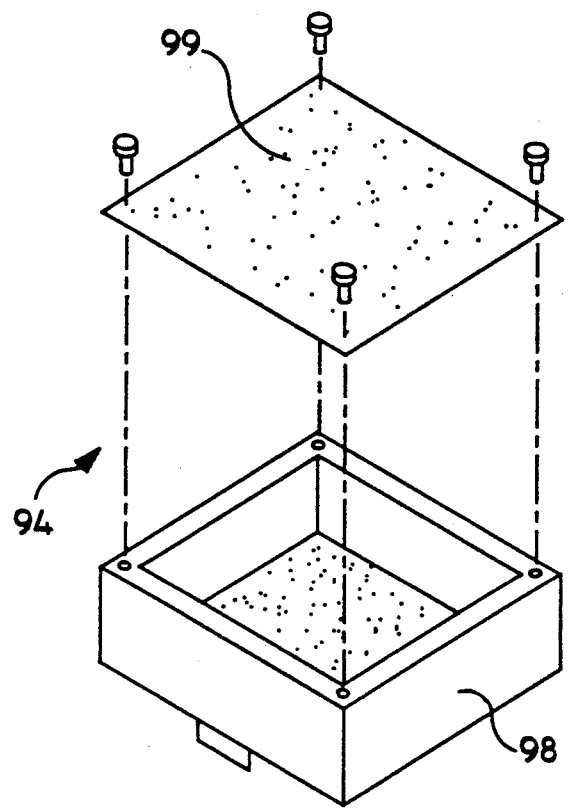
FIG. 7 is a simplified exploded view of an aerosolized particulate means of the food frying device according to the present invention.

The adsorption filter means 94 may comprise an activated charcoal filter, depicted in FIG. 7. The charcoal filter is constructed from a stainless steel cage 98 filled with activated charcoal (not shown) and enclosed on the top and bottom by a filter material 99. The activated charcoal filter traps odors associated with oil-laden vapors.

The unified sequential filtration means 82 is constructed such that the individual filters are easily removable for cleaning and refilling. Additionally, the frying device is equipped with an air pressure switch (not shown) that automatically shuts off the device if any of the filters which comprise the unified sequential filtration means become clogged.

The air migration means, also shown in FIG. 6, cause the air to pass through the unified sequential filtration means 82 at a port 101 located at the base of the spatter arrest means 90 between the spatter arrest means 90 and the inner surface of the bottom wall 14 of the housing 10. The air migration means includes the air inlet orifice 88, and the air outlet orifice 86 disposed immediately above a blower means 84. Air migration includes generally the drawing of air into the housing 10, upward around the reservoir 52, back down through port 101 at the base of the unified sequential filtration means 82 and up through the ductless vent air outlet orifice 86. This air migration path is shown by dotted lines in FIG. 6.

The air inlet orifice 88 is comprised of an opening in the base of the side wall 20 of the housing 10. In a preferred embodiment, the food outlet means 76 also serves as the air inlet orifice 88 (FIG. 1). Air is pulled into the housing 10 through the air inlet orifice 88. In alternative embodiments, the air inlet orifice 88 consists of an opening (not shown) in the base of the side wall 20 of the housing 10 covered by mesh or screen.

As shown in FIG. 6, mounted immediately above and aligned with the adsorption filter means 94 is the blower means 84. The blower means 84 draws the air in from the air inlet orifice 88, up through the unified sequential filtration means 82, and out through the air outlet orifice 86. The blower means 84 may comprise a stainless steel motored fan.

Mounted immediately above and aligned with the blower means 84 is a damper means 100 (not shown). Damper means 100 comprises means by which migrating air is prohibited from leaving the air outlet orifice 86. For example, if smoke or fire commences in the housing 10, as part of a fire suppression means 110, the damper means 100 serves to prohibit air from exhausting from the air outlet orifice 86, thereby containing the smoke or fire within the housing 10.

Figure 8:
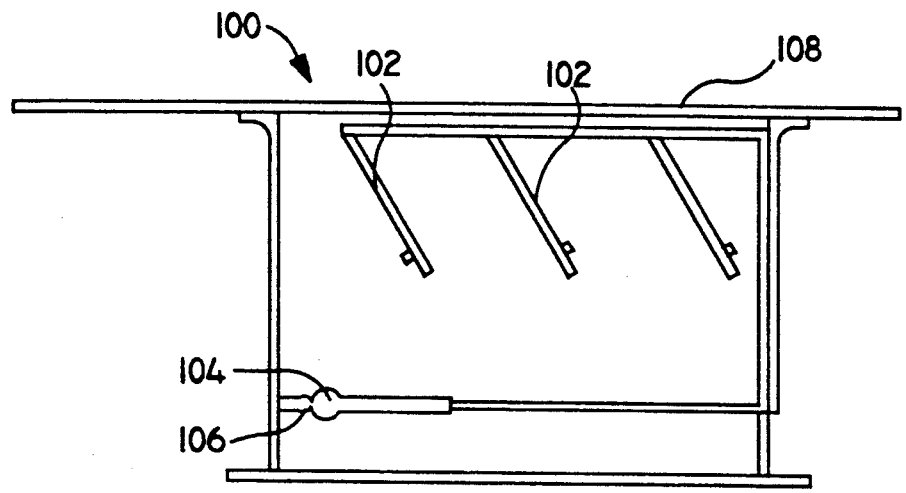
FIG. 8 is a simplified side view of the damper means of the food frying device according to the present invention.

The damper means 100 consists of a series of parallel angled planar members 102 (FIG. 8), supported on a planar member 108. The parallel angled planar members 102 generally remain in a downwardly inclined position to enable air to pass through to the air outlet orifice 86 aligned directly above. When instructed to by the fire suppression means 110, a hook 104, which is latched to a link 106, releases, thereby causing the parallel planar members 102 to rotate into a horizontal position parallel to the supporting planar member 108. This movement of the parallel planar members 102 thereby chokes the exiting exhaust.

As shown in FIG. 6, immediately above and aligned with the damper means 100 is the air outlet orifice 86. The air outlet orifice 86 preferably comprises a ductless vent. The ductless vent 86 is located in the rear portion of the top wall 12. The ductless vent 86, which may be constructed from stainless steel, is secured to the top wall 12 by means of machine screws (not shown). Air is drawn out of the housing 10 through the orifice 86.

The damper means 100 is utilized in conjunction with the fire suppression means 110, located behind the barrier wall 112, as shown in FIG. 6, which essentially divides the housing 10 into two areas. The barrier wall 112 preferably is constructed from stainless steel and continuously welded to prevent grease penetration. The first or proximal portion 114 is where frying is accomplished. The second or distal portion 116 is where the air contained in the housing 10 is cleaned, where the fire suppression means 110 is located, and where the electrical devices which operate the frying device are maintained.

The fire suppression means 110 is a means by which smoke or fire within the proximal portion 114 or distal portion 116 of the housing 10 can be detected and either automatically or manually extinguished. The fire suppression means 110 includes heat responsive elements 118, 120, a fire chemical canister 122 and a manual activator 124.

The heat responsive elements 118 and 120 detect the presence of a predetermined temperature and respond by emitting a chemical substance into the housing 10. In one embodiment, the heat responsive elements 118 and 120 comprise stainless steel nozzles surrounded by a wire cage. The nozzles 118 and 120 both originate in the distal portion 116 of the housing 10, with the head of the nozzle 118 protruding through a wall 126 and into an area downstream of the adsorption filter means 94. The head of the nozzle 120 protrudes through an aperture 128 into the upper area of the proximal portion 114 of the housing 10. When the head of the nozzle 120 senses a fire in the food preparation area 114, the fire chemical canister 122 is automatically activated.

The fire chemical canister 122 is a pressurized container in which a chemical, such as, Ansul, is stored. The fire chemical canister 122 is in communication with the heat responsive elements 118 and 120, and provides the chemical which is sprayed through the nozzles when activated. The fire chemical canister 122 is located in the distal portion 116 of the housing 10. The side wall 16 is provided with a circular transparency (not shown) in order to view the current amount of chemical within the canister 122.

The manual activator 124 provides for manual activation of the heat responsive element 120, located in the food preparation area 114. The manual activator 124 includes a handle 125, shown in FIG. 1, connected to a cable 144, shown in FIG. 9, which connects to the heat responsive element 120.

With reference to numerous other safety features of this food frying device, FIG. 1 shows a locking means 129 located on the door portion 24 of the housing 10, partially connected to the front wall 22 of the housing 10. The locking means 129 is comprised of an interlock latch whereby the door portion 24 of the housing 10 cannot be opened if the oil temperature is above a predetermined degree. The interlock latch 129 insures that the operator has no contact with the hot oil. Additionally, the frying device will not operate if the door portion 24 is ajar. In one embodiment, the predetermined temperature at which the interlock latch is operative is approximately 70° C./160° F.

Additional safety features include an oil temperature shut-off switch (not shown) interconnected with the temperature controls 60. When the temperature of the oil reaches a predetermined setting for a predetermined length of time, the frying device automatically turns off.

Additional safety switches may be affixed to numerous closure panels to ensure their proper placement within the unit. These safety switches are particularly important in view of the ease in removing such panels in order to clean within. For instance, a safety switch 130 (FIG. 6) may be affixed to the closure panel of the door portion 24 of the front wall 22 of the housing 10. A safety switch 132 may be affixed to the closure panel of the damper means 100. A safety switch 134 may be affixed to the closure panel of the unified sequential filtration means 82.

The electrical portion 136 (FIG. 1) of the food frying device is located in the distal portion 116 of the housing 10, adjacent the exhaust means portion including the unified sequential filtration means 82, the blower means 84, the damper means 100 and the air outlet orifice 86. The electrical portion 136 serves to activate various valves, cables, and motors under predetermined conditions, such as the motored rod 66 on the basket assembly 50, the heater assembly 56 on the reservoir 52, the heat responsive elements 118 and 120, the motor which commences the blower means 84, the various safety switches such as 130, 132, and 134, a keyboard display 138 (FIG. 1) located on the front wall 22 of the housing 10, and the temperature controls 60 regulated by the keyboard display 138. The actual microprocessors, circuit boards 146 (FIG. 9), circuit breakers, transformers 148, relays, terminal blocks, and other electrical constructions which control the operation of the frying device will not be described as they are entirely conventional.

Figure 9:
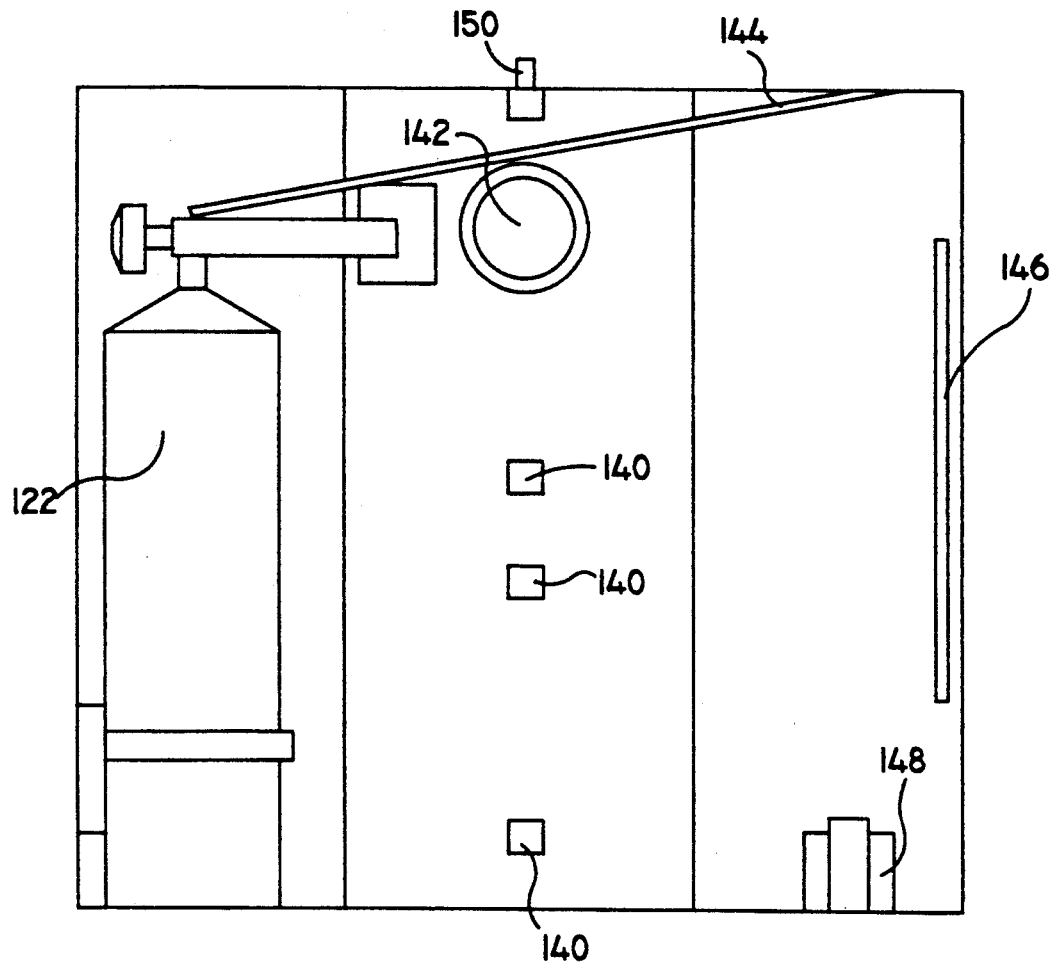
FIG. 9 is a simplified view of the electrical system of the food frying device according to the present invention.

FIG. 9 shows a simplified exposed view of a back portion of the housing 10 with the back wall 18 removed. Control switches 140 control the safety switches throughout the device. A safety switch 150 ensures proper enclosing of the back wall 18. An air flow switch 142 controls the blower means 84. The cable 144 controls the manual activator 124. The cable 144 is connected to the fire chemical canister 122. The circuit board 146 controls the functioning of the disclosed electrical devices of the present invention. The circuit board 146 is mounted on the side wall 20 of the housing 10. The transformer 148 is located beneath the circuit board 146.

In operation, the device can be used in any restaurant or commercial business for cooking a variety of food products, such as french-fried potatoes, vegetables, chicken, meat and fish. The device is plugged into a 240 volt outlet. The operator will ascertain whether the reservoir 52 is holding an appropriate quantity of cooking oil. The operator then pushes the "ON" button on the keyboard display 138 and the device will begin to heat up. A "WAIT" light on the keyboard display 138 will light up while the device in in the preheating phase. In this portion of time, power is applied to such places as the power means 56 on the reservoir 52, the motored rod 68 on the basket assembly 50, the motor which commences the blower means 84, and the temperature controls in the heat responsive elements 118 and 120. A blower means 84 draws air into the housing 10 through the air inlet orifice 88, and out of the housing 10 by traversing the unified sequential filtration means 82, the blower means 84, the damper means 100 and, finally, the air outlet orifice 86. When the "WAIT" light on the keyboard display 138 turns off, the oil has reached the predetermined working temperature. In one embodiment this working temperature is set at 350°. When the device is ready for food preparation a "READY" light on the keyboard display 138 turns on. In addition, the keyboard display 138 reveals the present oil temperature setting.

The operator will then open and fill the door or chute 28 with a chosen food product. When the operator shuts the door or chute 28, the food product will immediately fall into the basket assembly 50, the basket assembly 50 being in its first food receiving position resting immediately above the oil reservoir in the reservoir 52. The operator then enters the desired time on the keyboard display 138. When the desired time is entered, the motored rod 68 immediately lowers the basket into the second food lowering position, situating the basket assembly 50 within the oil reservoir in the reservoir 52. The keyboard display 138 indicates that the device is in use by displaying "WAIT." When the allocated time has passed, which is indicated on the keyboard display 138 by the countdown of seconds still remaining, the motored rod 68 will rotate the basket assembly 50 into the third food raising position and move the basket assembly 50 out of the oil reservoir and to a position directly above the reservoir 52. The motored rod 68 automatically continues rotating the basket assembly 50 into the fourth oil drainage position for approximately 12 seconds. Finally, the motored rod 68 automatically continues rotating the basket assembly 50 into the fifth food deposit position, wherein the basket assembly will deliver the food product to the operator by means of the food outlet means 76. The motored rod 68 then repeats the fourth position and fifth position. The keyboard display 138 removes the "WAIT" display. The operator may choose to place a receiving container (not shown) at the base of the food outlet means 76. The motored rod 68 then returns to the basket assembly 50 to the first food receiving position to await additional food products. The keyboard display 138 at such time displays the "READY" light. In the alternative, the device can be turned "OFF" on the keyboard display 138. When the device is turned off, the heating device, along with all of the other electrical devices, is similarly turned off. There is no need to pull the plug at the end of the working day.

It is to be understood that the present invention is by no means limited to the particular construction herein disclosed and/or shown in the drawings, but also comprises any modifications or equivalents within the scope of the claims. For example, the above device comprises a single food intake means, reservoir, support means, drive means, food outlet means and power means. However, it would be considered obvious to those skilled in the art to construct a device with a multiplicity of such units in one device to provide for the simultaneous cooking of a variety of foods or the same type of foods being cooked at a variety of intervals.

Having thus described our invention, what we claim as new and desire to secure by Letter Patent of the United States is:

1. An automatic food frying and dispensing device comprising:
   a housing having a top wall, a bottom wall, two side walls, a back wall and a front wall, said front wall including a door portion enabling access to the interior of said housing,
   a food intake means traversing said door portion of said wall of said housing,
   a reservoir located within said housing, said reservoir accommodating a reservoir of liquid,
   support means located within said reservoir, for supporting a food product in said housing,
   drive means interconnected with said support means, said drive means establishing cyclical positions for said support means,
   food outlet means located on a bottom portion of one of said side walls of said housing,
   power means disposed in said reservoir,
   exhaust means located in air circulating communication with said housing, said exhaust means comprising a unified sequential filtration means and air migration means,
   said unified sequential filtration means being located within a predetermined path of the air circulation produced by said air migration means,
   said air migration means comprising portions of said housing, an air inlet orifice, an air outlet orifice, and a blower means, said blower means being disposed proximate said air outlet orifice,
   said blower means establishing a circulation of air within said housing,
   locking means located on said front wall of said housing, said locking means in lock position being adapted to prohibit access to the interior of said housing,
   fire suppression means located in said housing, said fire suppression means comprising damper means, heat responsive elements and a fire chemical canister.

2. The device according to claim 1 wherein said food intake means comprises an intake door which is pivotally connected to said front wall door portion, three side walls and a chute plate extending from the front wall inwardly toward the interior of the housing, said food intake means being in communication with said support means, whereby to permit food to enter the housing and to be received by said support means, while prohibiting other access by means of an end piece of said chute plate abutting an end piece of an inhibition plate, said inhibition plate extending from the interior surface of said front wall.

3. The device according to claim 2 wherein said drive means comprises a motored shaft operable to automatically position said support means in said cyclical positions.

4. The device according to claim 3 wherein said cyclical positions comprise:
   a first position situating said support means above said reservoir, for receiving food from said intake door, a second position situating said support means in said reservoir for cooking the food, a third position situating said support means out of said reservoir for terminating cooking of the food, a fourth position situating said support means on an angle for drainage of liquid from the food, and a fifth position situating said support communication with said food outlet means for depositing the cooked food in said food outlet means.

5. The device according to claim 4 wherein said food outlet means comprises an opening formed in one of said housing walls, and wherein the food in the fifth position in said support means exits the interior of said housing through said opening in said side wall.

6. The device according to claim 4, wherein said support means comprises a basket assembly.

7. The device according to claim 5, wherein said food outlet means further comprises an exit chute in the bottom portion of said wall having said opening.

8. The device according to claim 7 wherein said exit chute is removably mounted in said wall.

9. The device according to claim 7, wherein said food outlet means further comprises an angular planar member.

10. The device according to claim 1, further comprising means for sensing that the front wall door portion is in a closed position.

11. The device according to claim 1, further comprising means for sensing that the damper means is securely positioned.

12. The device according to claim 4, further comprising means for signaling that said food product has been cooked and deposited into said food outlet means.

13. The device according to claim 1, wherein said unified sequential filtration means comprises a spatter arrest means, an aerosolized particulate means, and an adsorption filter means, said spatter arrest means being disposed downstream of said aerosolized particulate means, and said aerosolized particulate means being disposed downstream of said adsorption filter means.

14. The device according to claim 13 wherein said spatter arrest means comprises a grease baffle filter, said aerosolized particulate means comprises a mesh filter, and said adsorption filter means comprises a charcoal filter.

15. The device according to claim 13 wherein said unified sequential filtration means further comprises a cover plate.

16. The device according to claim 15, further comprising means for sensing that said cover plate of said unified sequential filtration means is closed.

17. The device according to claim 14, further comprising an air pressure switch operable to automatically shut off said device if any of the filters which comprise said unified sequential filtration means become clogged.

18. The device according to claim 1, further comprising means for displaying length of cooking time.

19. The device according to claim 1, further comprising a circular transparency located on one of said side walls of said housing to enable viewing of the amount of fluid within said fire chemical canister.

20. The device according to claim 1, further comprising means for the simultaneous cooking of multiple food batches which may be inserted, started, timed, stopped, and dispensed independently of each other.

21. The device according to claim 20, wherein said means for the simultaneous cooking of multiple food batches comprises at least one additional food intake means traversing said door portion of said front wall of said housing, reservoir located within said housing, support means located within said reservoir, drive means interconnected with said support means, food outlet means located on a bottom portion of one of said side walls of said housing, power means disposed in said reservoir.

* * * * *

UNITED STATES PATENT AND TRADEMARK OFFICE
CERTIFICATE OF CORRECTION

PATENT NO. : 5,275,090
DATED : January 4, 1994
INVENTOR(S) : Connell, D.P.

It is certified that error appears in the above-indentified patent and that said Letters Patent is hereby corrected as shown below:

Column 13, line 7, after "support" insert -- means in --.

Signed and Sealed this

Eleventh Day of October, 1994

Attest:

BRUCE LEHMAN

*Attesting Officer*  *Commissioner of Patents and Trademarks*